United States Patent [19]

Boynton

[11] Patent Number: 4,655,195
[45] Date of Patent: Apr. 7, 1987

[54] SOLAR HEAT REGULATOR

[75] Inventor: Sharon L. Boynton, Cleveland Heights, Ohio

[73] Assignee: Solara, Inc., Mayfield Heights, Ohio

[21] Appl. No.: 815,268

[22] Filed: Dec. 24, 1985

Related U.S. Application Data

[63] Continuation of Ser. No. 709,352, Mar. 7, 1985, abandoned, which is a continuation of Ser. No. 387,429, Jun. 11, 1982, abandoned.

[51] Int. Cl.$^4$ ............................................. E04D 13/18
[52] U.S. Cl. .................................. 126/429; 160/166 A
[58] Field of Search ............... 126/428, 429, 430, 440, 126/446, 438, 426, 419, 437; 160/166 A, 172

[56] References Cited

U.S. PATENT DOCUMENTS

| | | | |
|---|---|---|---|
| 2,207,420 | 7/1940 | Thomas | 160/166 A |
| 2,605,824 | 8/1952 | Armstrong | 160/166 A |
| 3,012,294 | 12/1961 | Waldor | 126/429 X |
| 3,468,360 | 9/1969 | Payne | 160/172 |
| 3,990,635 | 11/1976 | Restle et al. | 126/429 X |
| 4,054,125 | 10/1977 | Eckels | 126/440 |
| 4,143,640 | 3/1979 | Pierce | 126/437 X |
| 4,144,931 | 3/1979 | Medico | 126/446 X |
| 4,191,165 | 3/1980 | Faudarole | 126/428 X |
| 4,219,008 | 8/1980 | Schultz | 126/419 X |
| 4,232,731 | 11/1980 | Kaplow et al. | 126/430 X |
| 4,243,022 | 1/1981 | Pedone | 126/446 X |
| 4,286,578 | 9/1981 | McArthur | 126/447 X |
| 4,301,787 | 11/1981 | Rice | 126/901 X |
| 4,327,795 | 5/1982 | Wheeler | 126/432 X |
| 4,351,320 | 9/1982 | Tetirick | 126/429 X |

Primary Examiner—Carroll B. Dority, Jr.
Attorney, Agent, or Firm—Robert R. Hussey

[57] ABSTRACT

A solar heat regulating device selectively heats, with sunlight, the air in a building having a window therein and alternately shields and insulates the air in the building from the heat of sunlight. A frame is provided for mounting the solar heat regulating device inside the structure adjacent to the window. A plurality of hollow vanes each of which have a passageway therethrough. Each of the vanes has a heat absorptive surface on one side which allows solar radiation impinging thereon to heat the air in the passageways of the vanes. The vanes also have a heat reflective surface on another side. The heat reflective surface reflects the solar radiation impinging thereon and insulates the air inside the building from the heat of the sunlight. The vanes are rotatably mounted about vertical axes and spaced so that either the heat absorptive surfaces on the vanes or the heat reflective surfaces on the vanes may face the outside of the building. The device includes means for sealing the outside facing surfaces of the vanes from the inside of the building. Manifold means are also provided for conducting the cooler air from the inside of the building to the bottom of the passageways in the vanes and for conducting the heated air from the top of the passageways of the vanes to the inside of the building.

9 Claims, 11 Drawing Figures

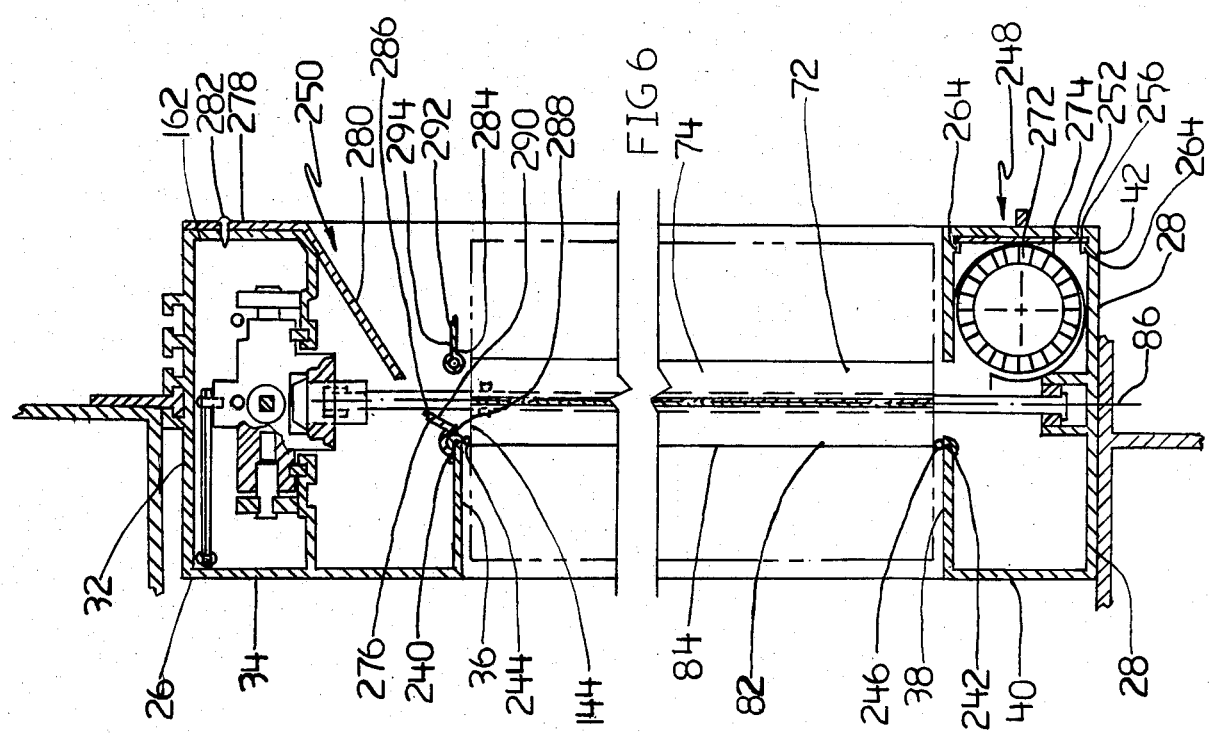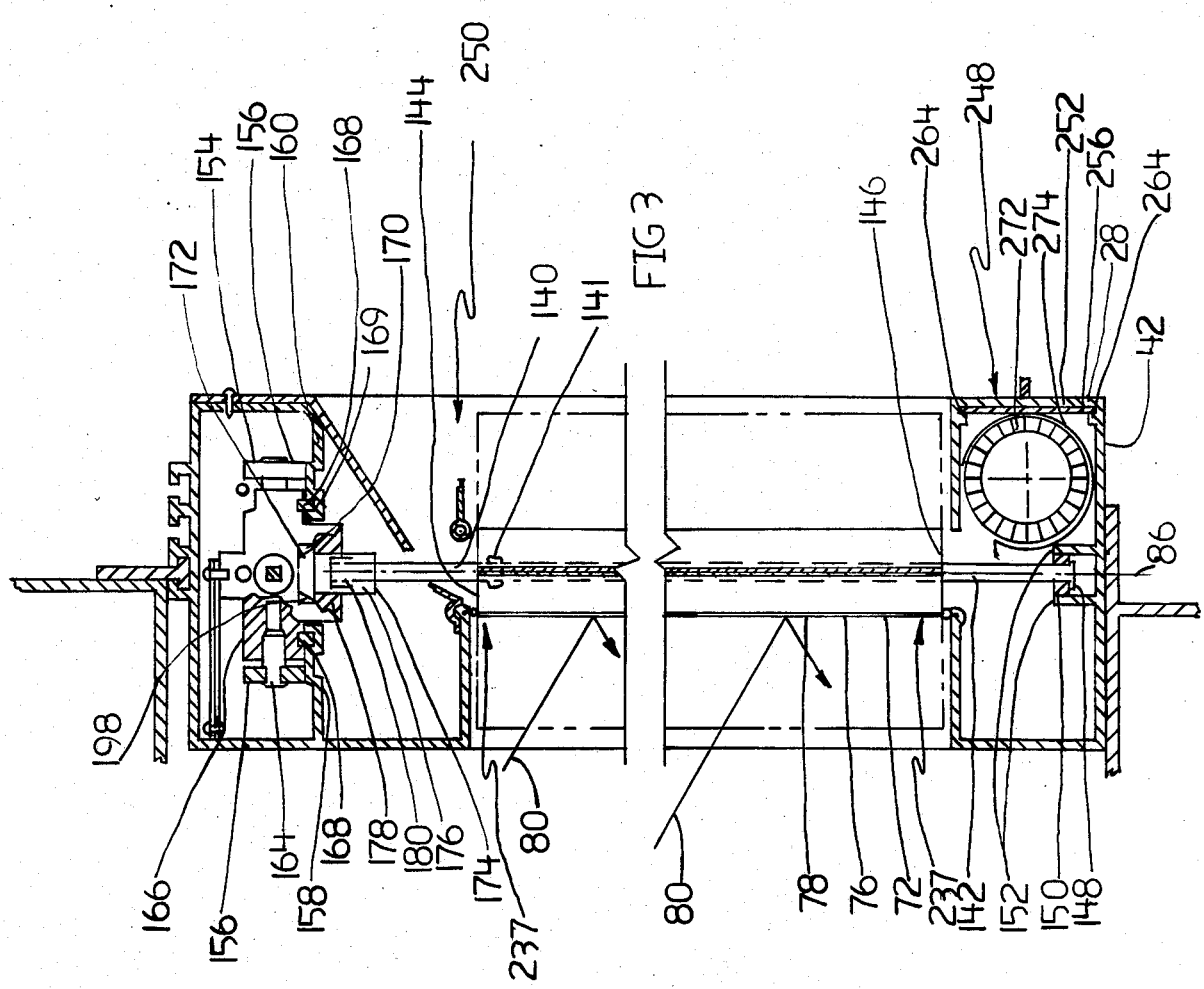

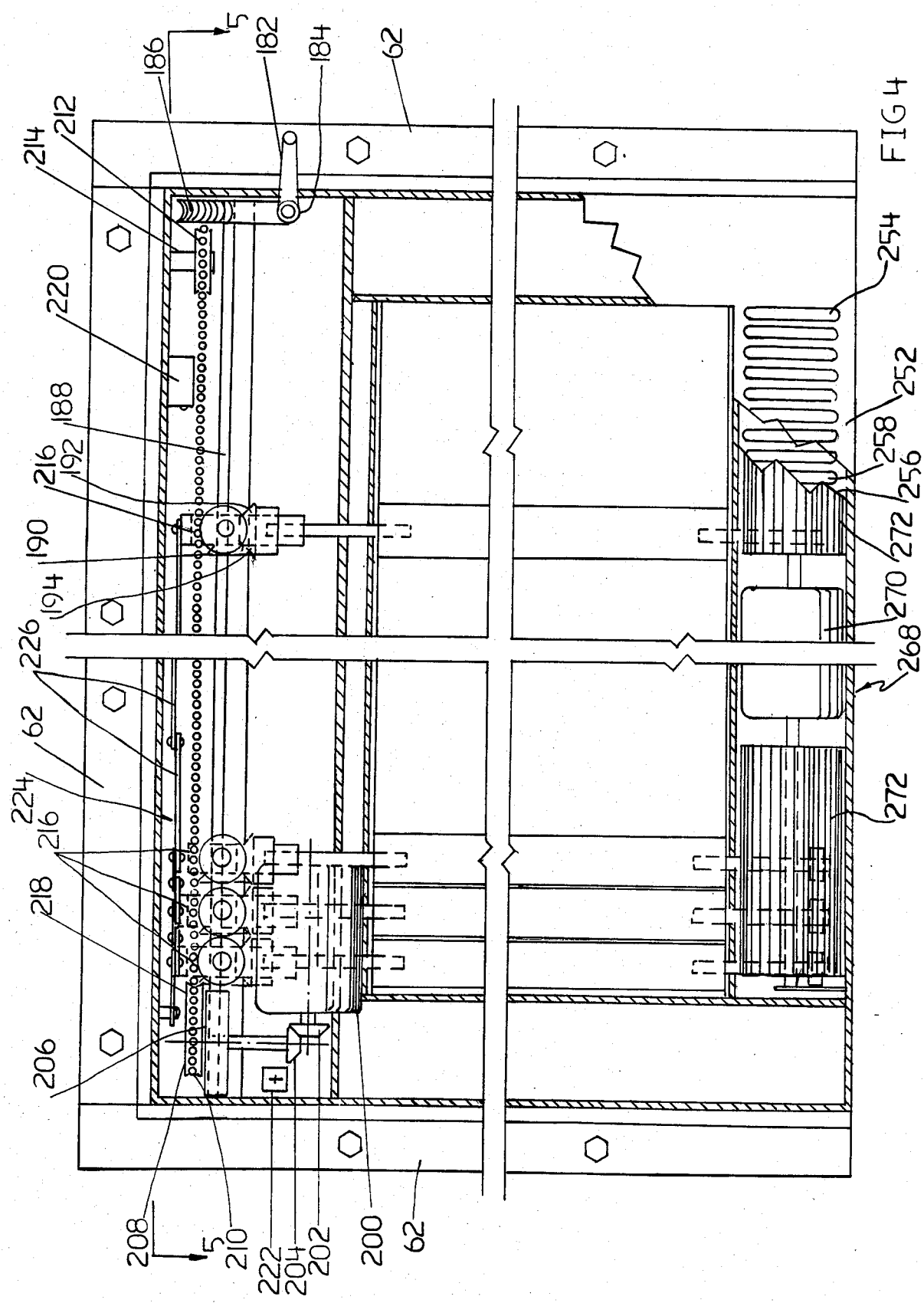

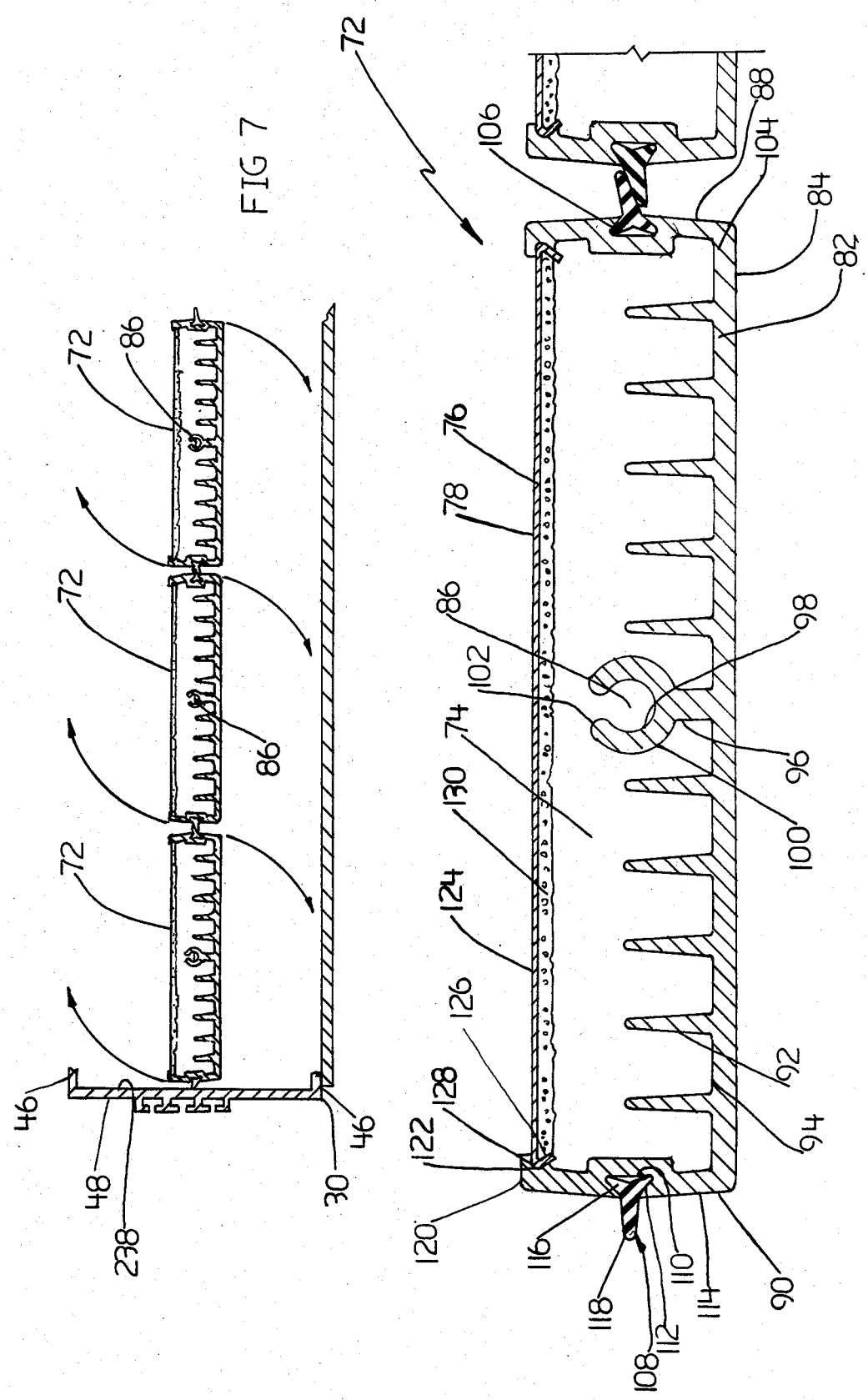

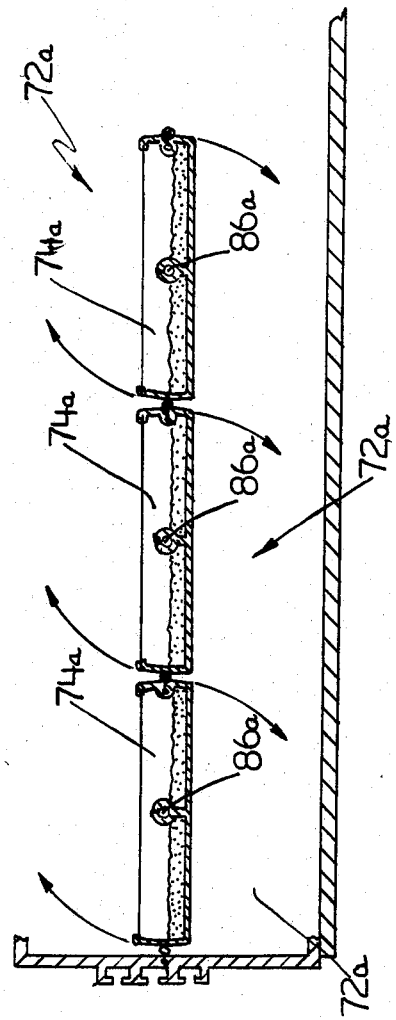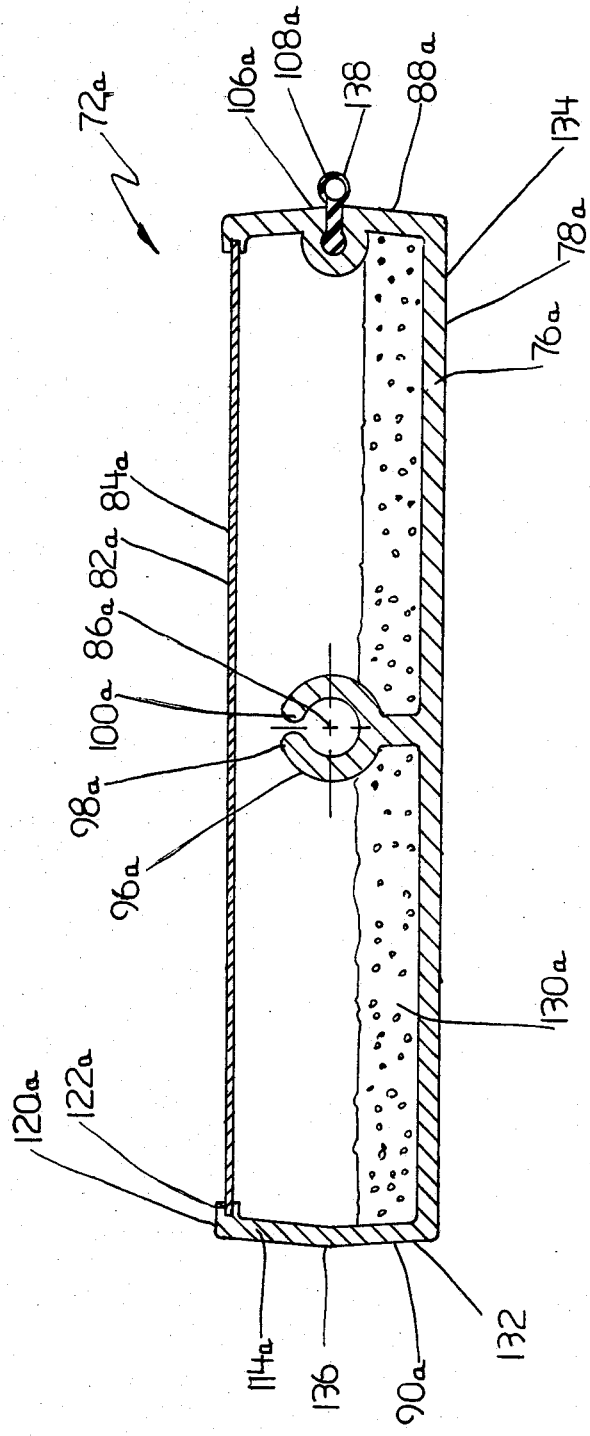

SOLAR HEAT REGULATOR

This application is a continuation of application Ser. No. 06/709,352, filed 3/7/85 and abandoned, which was a continuation of prior application Ser. No. 06/387,429 field on 6/11/82 and now abandoned.

FIELD OF THE INVENTION

The present invention relates generally to the art of solar heat regulating devices and in particular to such devices which use hollow vanes to selectively heat or insulate the air in a structure.

BACKGROUND OF THE INVENTION

Due to the rapidly increasing costs and shortages of energy, it is particularly desirable to develop new and more efficient systems which assist in the maintenance of a uniform temperature inside a structure using the heat of sunlight. Such systems are preferably capable of converting the energy available in sunlight to heat the air in a building when the inside temperature is too low and conversely, insulating the inside air from the outside atmosphere when it is desired to stop heat transfer between the inside and outside air. The development of the use of solar energy to achieve this result has been hampered by numerous problems such as installation in existing structures without major renovations or other structural changes to the existing building, size of the unit, cost efficiency, aesthetics, low start up time, etc.

Known solar devices for heating the air in a room, have provided spaced panes of glass as seen in Jacobs, U.S. Pat. No. 4,151,954, and exterior heating panels such as shown in Lorenz, U.S. Pat. No. 4,237,865.

Other known solar heating devices have utilized the venetian blind type panels. Such known devices are disclosed in Pierce, U.S. Pat. No. 4,143,640 and Tisch, et al, U.S. Pat. No. 4,220,137 which disclose louvers which are adjustable to reflect the sunlight impinging thereon to a solar collector.

Yet another known venetian blind type device as disclosed in Angilletta, U.S. Pat. No. 4,002,159, discloses a venetian blind with a heat absorptive surface on one side of the venetian blind slats and a reflective surface on the other side of the slats.

One desirable feature of a solar heat regulating device is to assist in the maintenance of a uniform temperature inside of a building by converting the energy available in sunlight to heat the air in the building when the inside temperature is too low. For example, on a cold, sunny day, the outside temperature may be low but the sunlight is capable of heating. Thus, it is desirable that the solar heat regulating device efficiently transfer the heat from the sunlight to the air inside the building.

Conversely, it is a desirable feature to insulate the inside air from the outside atmosphere during certain periods of time to stop heat transfer therebetween. For example, on a cold day when the sun is not shining, the temperature of the inside air is more effectively held at a uniform level if the amount of heat which can escape from the inside to the outside through the window is minimized. Also, in the summer when the outside air has a greater temperature than the inside air, it is desirable to stop the transfer of heat from the outside air to the inside air.

Another desirable feature of a solar heat regulating device is to maximize the efficiency of the heating and insulating features described above.

Another particularly desirable feature of a solar heat regulating device is that it be capable of being retrofitted into an existing window in an existing building without major renovations or other structural changes to the existing building.

Yet another desirable feature is to provide a device which can be mounted inside of a window of an existing structure so that the device is protected from the elements, can be operated from the interior of the building without any connections to the exterior of the building. This feature also allows for the minimization of installation costs. By mounting the device adjacent to a window and inside the building, it is not necessary to create openings in the building to conduct the heat inside.

Another feature of a solar heat regulating device is that it have simplicity of operation, attractive appearance, and minimal, if any, power consumption in operation.

Another desirable feature of a solar heat regulating device is that it have a low start up time. For example, when units are mounted outside of buildings, the units cool down when not operating in low outside temperatures and require substantial periods to start up when the sunlight contacts them.

Another desirable feature of a solar heat regulating device for window areas is to be capable of intercepting all of the incoming solar radiation but one which, nevertheless, permits visibility through the window.

Another desirable feature is to provide a solar heat regulating device which is relatively economical to construct, operate and install, is small in size and aesthetically pleasing.

SUMMARY OF THE INVENTION

The present invention provides the above-described desirable features with a new and improved solar heat regulating device having a plurality of hollow vanes with a passageway therethrough. Each of the vanes has a heat absorptive surface on one side and a heat reflective surface on another side. The vanes are rotatably mounted to a frame about spaced vertical axes so that either the heat absorptive surfaces on the vanes or the heat reflective surfaces on the vanes may selectively face the outside of the building. Manifold means are provided for conducting the cooler air from the inside of the building to the bottom of the passageways in the vanes and for conducting the heated air from the top of the passageways of the vanes to the inside of the building.

The solar heat regulator of the present invention allows for the efficient heat transfer of the heat from the sunlight to the air inside of the building on a cold day when the heat absorptive surfaces of the vanes face the outside of the building. When the sunlight impinges on the window and subsequently the heat absorptive surface, the vane is heated and the air between the vanes in the window is also heated by any sunlight reflected by the vanes. The present invention provides for sealing the outside facing surfaces of the vanes from the inside of the building to thereby create a "dead" air space between the window and the outside facing surfaces of the vanes. The air in this "dead" air space is heated and increases the efficiency of the heat transferred to the air flowing through the passageways in the vanes. It should also be understood that in the winter when the sunlight is no longer available, the "dead" air space between the vanes and the window operate to insulate the inside air from the outside air and accordingly, assist in maintaining a uniform temperature in the building.

In the heating mode, the cooler air in the room enters the bottom of the passageways in the vanes and as it is heated flows upwardly through the passageways by a known "chimney" effect. This heated air is then conducted back into the room from the top of the passageways. Since the air flows through the vanes by the "chimney" effect, no circulating fans or other powered devices are necessary to operate the present invention. Of course, fans may be provided for use in conjunction with the present invention but require an extremely small amount of power.

The solar heat regulating device of the present invention is also capable of efficiently insulating the inside air from the outside atmosphere when it is desired to stop heat transfer therebetween. In this mode, the vanes of the present invention are rotated about their vertical axes so that their heat reflective surfaces face the outside of the building and are sealed from the inside of the building.

Accordingly, in the summer when the sunlight impinges on the window and subsequently on the heat reflective surface, the incoming rays of the sun are reflected before entering the inside of the building. Since the heat reflective surfaces are sealed from the inside of the building, the "dead" air space between the window and the reflective surfaces of the vanes act to insulate the inside from the outside. The quantity of the heat entering the building is thus reduced to accordingly maintain a uniform temperature inside of the building. Where an active cooling system is employed in the summer, cooling load power consumption and equipment requirements are reduced.

The frame of the solar heat regulating device of the present invention is sized so as to be retrofitted into the existing windows of a building. Furthermore, the design of the present invention allows the other components thereof to be sized so that they may be fitted inside the frame of the solar heat regulating device of the present invention without taking up an excessive or inconvenient amount of room inside of the building. This feature allows for minimization of installation costs and does not necessitate structural changes or openings in the building which accordingly minimizes the installation costs.

In addition, since the present invention can be mounted inside of a window, it is protected from the elements and can be operated from the interior of the building without any connections to the exterior of the building and minimizes deterioration of the device of the present invention from exposure to atmospheric temperature fluctuations, wind, rain, snow, hail and dirt and other contaminants which shorten the devices useful life. This feature also decreases the start up time of the device since the device does not cool down in the lower outside temperatures.

The present invention also provides an aesthetically pleasing solar heat regulating device since the vanes may be moved to a position substantially vertical to the window for viewing through the window. In addition, the vanes of the present invention may be moved horizontally so that they stack at one side of the window to thereby allow for clear viewing through the window.

The present invention also achieves the desirable feature of efficient operation as described above with various design features which may be incorporated into the vanes such as insulation material adjacent to the heat reflective surface which minimizes the amount of heat conducted to the air inside the passageway, a thin heat reflective surface which minimizes the amount of heat stored in the portion of the vane forming the heat reflective surface, heat exchange fins in the vane passageway and thermally connected to the heat absorptive surface to more efficiently transfer heat from the heat absorptive surface to the air passing through the passageway, utilizing materials having a high co-efficient of thermal conductivity to form the heat absorptive surface and texturing the heat absorptive surface to increase the amount of heat absorbed thereby.

The present invention provides a solar heat regulating device which is economical to construct, operate and install, simple in operation, attractive in appearance, and maximizes cost efficiency.

Further features and advantages of the present invention will be apparent to those skilled in the art to which it relates from the following detailed description of the invention made with reference to the accompanying drawings forming a part of this specification.

BRIEF DESCRIPTION OF THE DRAWINGS

In the drawings:

FIG. 3 is a cross-sectional view of the solar device shown in FIG. 2 taken along lines 3—3 thereof with the vanes in the insulating mode;

FIG. 4 is a fragmentary front elevational view of the solar device shown in FIG. 2 with portions thereof cut away;

FIG. 6 is a fragmentary sectional view of the solar device as shown in FIG. 3 with the vanes moved to a heating mode FIG. 7 is a sectional view of certain of the vanes of the solar device of the present invention shown in FIG. 2 with the vanes moved to a heating mode;

FIG. 8 is a enlarged sectional view of a portion of the vanes shown in FIG. 7;

FIG. 9 is a cross-sectional view of another embodiment of the solar device of the present invention;

FIG. 10 is an enlarged sectional view of one of the vanes shown in FIG. 9; and

DETAILED DESCRIPTION OF THE INVENTION

Figure 1:
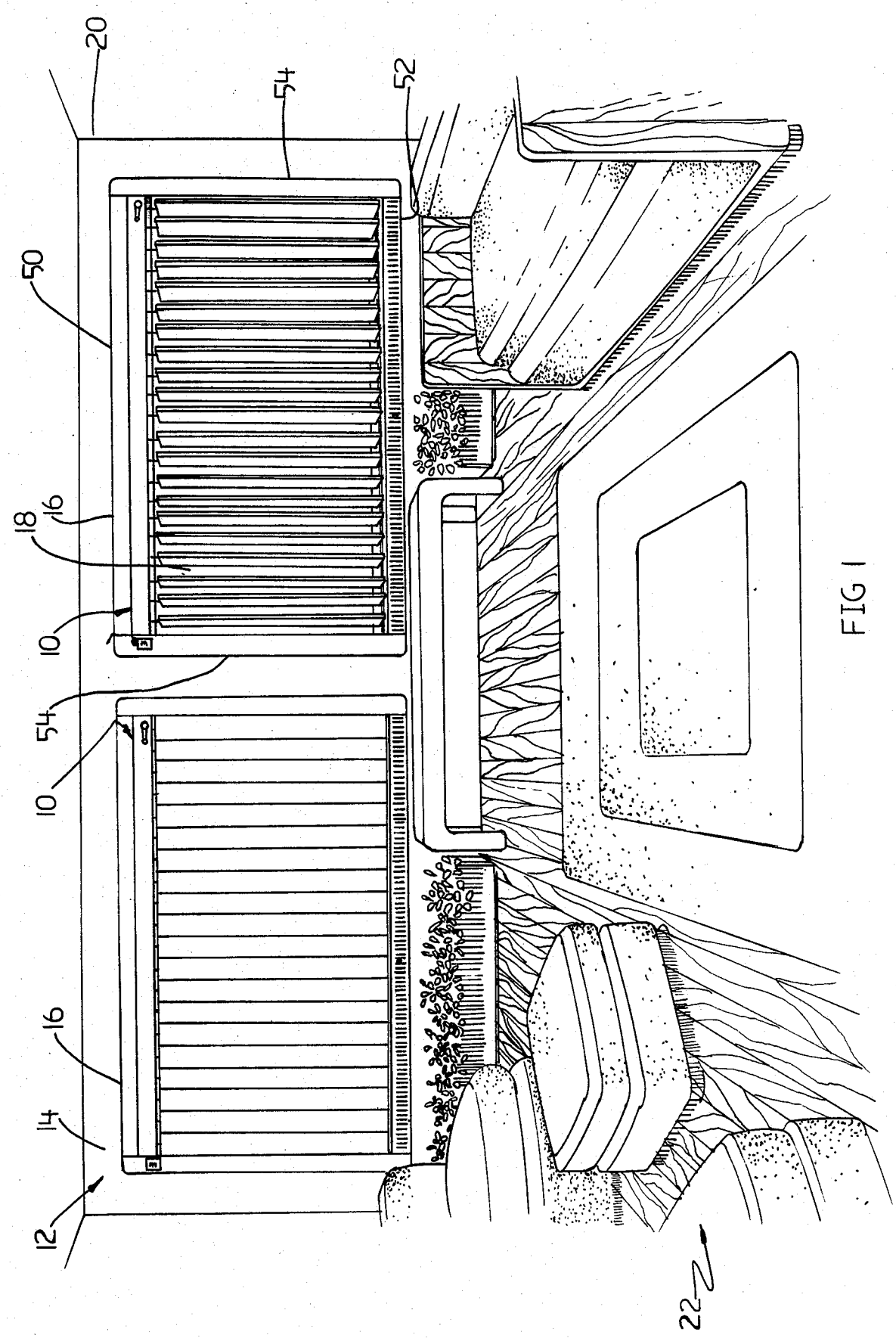
FIG. 1 is a front elevational view of the preferred embodiment of the present invention mounted in the windows of a conventional building.

The present invention provides an improved solar heat regulating device which assists in the maintenance of a uniform temperature of the atmosphere inside a building. When the inside temperature is too low, the solar heat regulating device of the present invention converts the energy available in sunlight to heat the air in the building. Conversely, when it is desirable to stop heat transfer between the outside and inside air, the present invention is capable of shielding and insulating the inside air from the outside atmosphere.

The present invention is capable of being retrofitted into an existing window of an existing building which minimizes structural changes to the building, can be operated from the interior of the building without any connections to the outside of the building, is simple in operation, attractive in appearance, has a low start up time, is economical to construct, operate and install and is small in size and aesthetically pleasing. For purposes of illustration, one representative design as shown in the drawings is applied to the solar heat regulating device 10 as shown in FIG. 1.

The solar heat regulating device 10 shown in FIG. 1 is used to assist in the maintenance of a uniform temperature of the air in a building 12. The building 12 may be of new construction or an existing structure having one or more conventional window openings 16 in the exterior wall 14 of the building. As is known, a window 18 is mounted in each of the window openings 16 and separates the inside air from the outside atmosphere. The window 18 is generally sealed along the window opening 16 and may be of any construction.

The building 12 also has interior walls 20 which form a room, generally indicated at 22. The solar heat regulating device 10 of the present invention is provided to assist in the maintenance of a uniform temperature inside of the room 22 by using sunlight to heat the room when desired and conversely insulate the room from the outside atmosphere and shield the inside atmosphere from the sunlight when desired.

Figure 2:
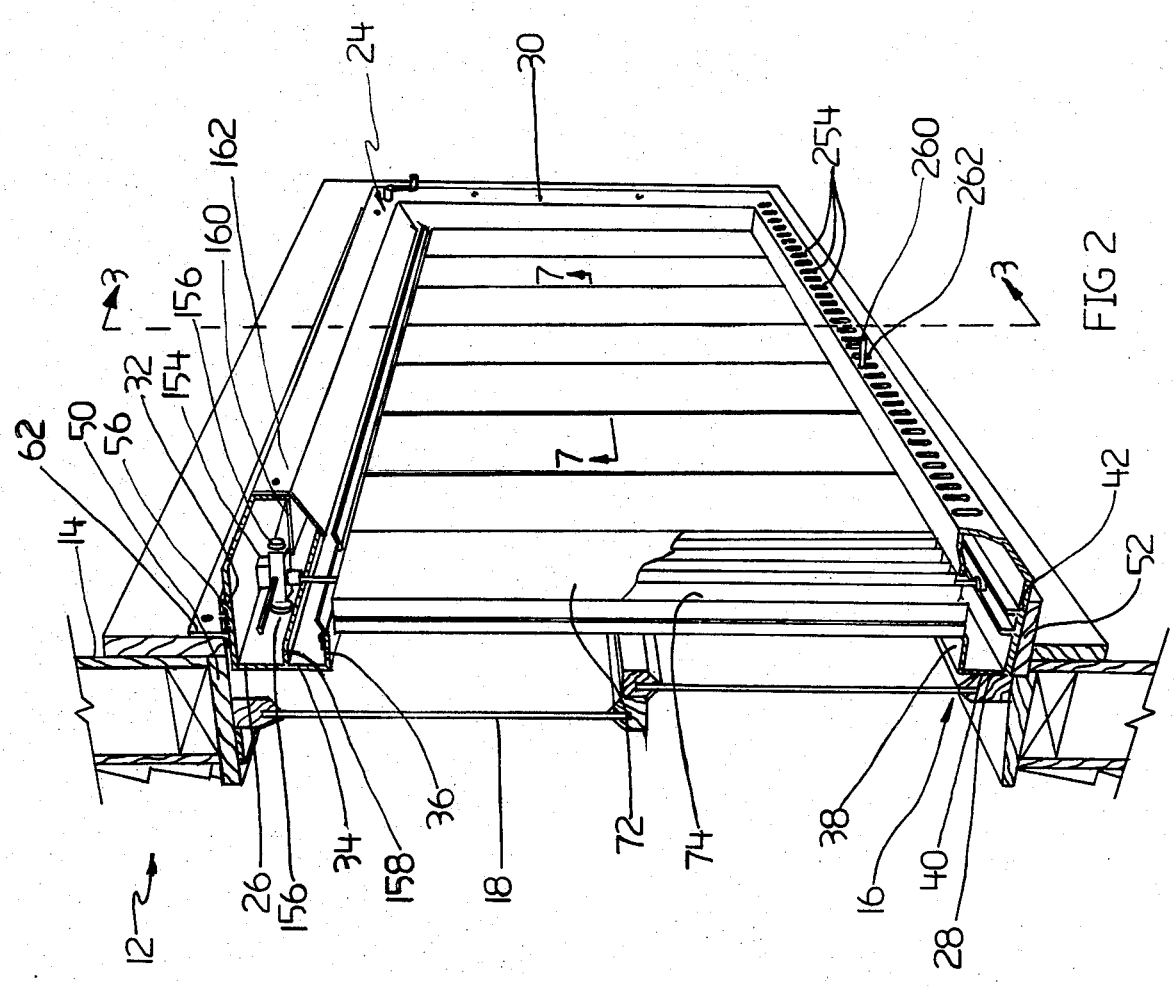
FIG. 2 is a perspective view of the solar device of the present invention mounted in a window with the vanes thereof in an insulating mode.

The solar heat regulating device 10 includes a frame 24 which is sized so as to be retrofitted into the window opening 16 of an existing structure as shown in FIG. 2. Generally, the window openings 16 in existing structures are dimensioned to fit established window opening standards. The frame 24 is sized to fit these standard window openings and be mounted therein.

The frame 24 includes an upper frame member 26, a lower frame member 28, and vertical frame members 30. The frame members 26, 28 and 30 are sized so that the frame 24 fits standard sized window openings 16. Each of the vertical frame members 30 have one of their ends secured to the upper frame member 26 and the other end secured to the lower frame member 28 by any known means.

Figure 5:
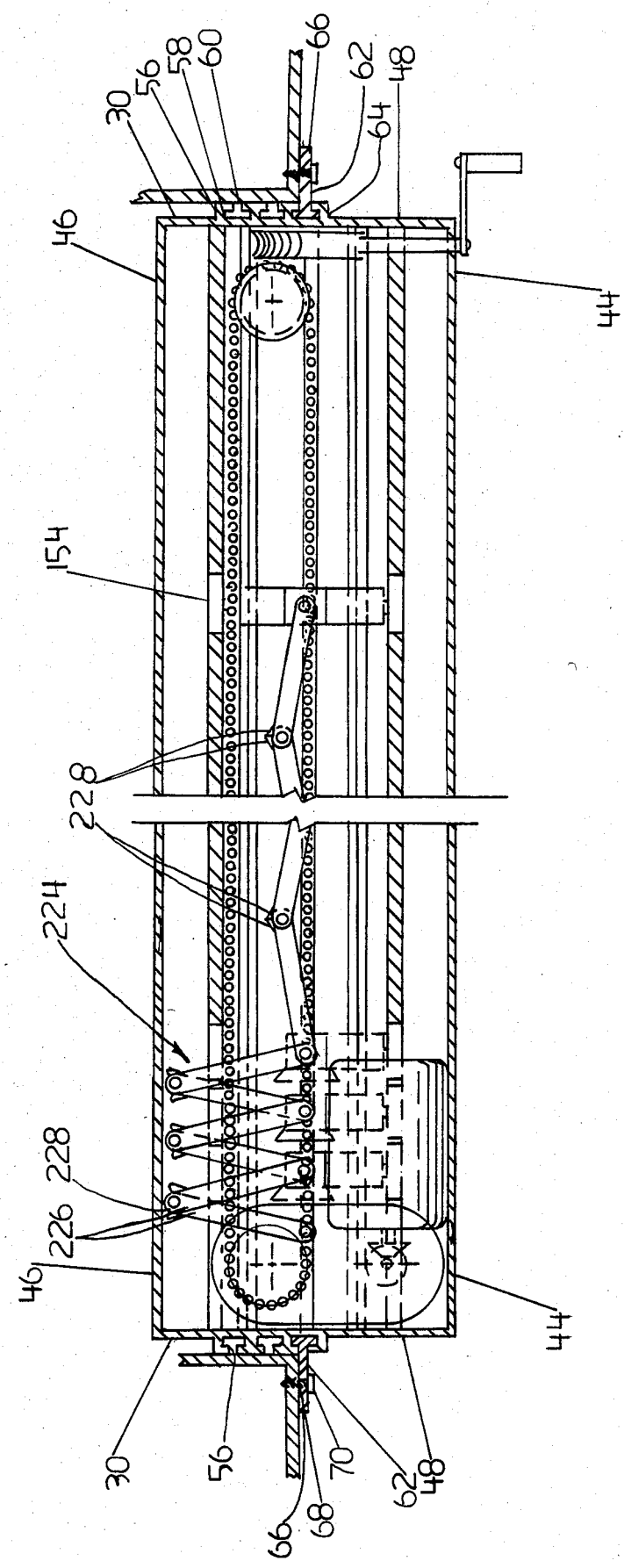
FIG. 5 is a top sectional view of the device shown in FIG. 4 taken along lines 5—5 thereof.

To allow for installation of the solar heat regulating device 10 of the present invention in standard windows and allow for variations in construction, the upper frame member 26 has upper, side and lower flange portions 32, 34, 36 respectively. The lower frame member 28 also has an upper flange portion 38, a side flange portion 40 and a lower flange portion 42, while the vertical frame member 30 has inner, outer and side flange portions 44, 46, 48 respectively as seen in FIGS. 2, 5, and 7.

The frame 24 is positioned so that the upper flange portions 32, 38 of the upper and vertical frame members 26, 30 and the side flange portions 48 of the vertical frame members 30 are adjacent to the upper, lower and side sills or window frame members 50, 52, 54, respectively defining the window opening 16. The upper flange portion 32 and the outer flange portion 46 of the frame 24 include a plurality of T-slots 56 extending along the length of the upper frame member 26 and also a plurality of T-slots 56 extending along the length of the vertical frame member 30 as seen in FIGS. 2 and 5. Accordingly, a T-slot 56 is positioned adjacent to both side sills and the top sill. The T-slots 56 have an enlarged inner slot 58 and a smaller outer slot 60 adjacent to the enlarged inner slot which are generally in the shape of a T.

The frame 24 also includes mounting members 62 which have a generally T-shaped portion complimentary in shape with the shape of and adapted to be received in the T-slots 56. The mounting members 62 have a length complimentary with the length of the respective upper frame member 26 and vertical frame members 30 in which they are to be mounted as seen in FIGS. 2, 4 and 5. The mounting members 62 have an enlarged end portion 64 and outwardly extending webbed portions 66 which portions, 64 and 66, are complimentary in shape to the enlarged inner slot 58 and smaller outer slot 60 respectively of the T-slots 56 so that they may readily slide therein and yet be retained thereby.

The frame 24 includes means for securing the mounting members 62 to the upper and side window sills 50 and 54 and consequently to the building 12. This mounting means includes openings 68 in the mounting member 62 and fastening means 70 which passes therethrough. The fastening means may be any conventional known fasteners such as known screws or bolts.

When the solar heat regulating device 10 of the present invention is to be mounted in the window opening 16, the device is slid into the window opening 16. Movement of the device 10 toward the window is continued until the side flange portions 34, 40 of the upper and lower frame members 26, 28 respectively and the outer flange portions 46 of the vertical frame members 30 can no longer move towards the window 18 and are adjacent thereto.

The T-shaped mounting members 62 are then slid into the T-slots 56 of the upper and vertical frame members 26, 30 which are closest to the upper and side sills 50, 54 respectively. The lower flange portion 42 of the lower frame member 28 rests on the lower sill 52. The fasteners 70 are then inserted in the openings 68 and secured to the upper and side sills 50, 54 to rigidly secure the frame 24 to the building 12.

The fasteners 70 are tightened until the outwardly extending webbed portions 66 of the mounting members 62 are sealed against the upper and side sills 50, 54 respectively. In order to improve the seal between the T-shaped mounting member 62 and the sills 50, 54 and the lower frame member 28 and the lower sill 52, a gasket, caulking compound or any other conventional sealing means may be provided therebetween.

As can be seen from the above, the solar heat regulating device 10 of the present invention may be mounted in a conventional window opening 16 regardless of different constructions of the sills while still providing for sealing between the frame 24 and the building 12. Accordingly, the solar heat regulating device 10 of the present invention can be retrofitted into an existing window 18 in an existing building 12 without major renovations or other structural changes to the building. Furthermore, the present invention does not require any connections through the exterior wall 14 of the building 12 or other structural alterations to the building.

To implement the advantageous features of the present invention, the solar heat regulating device 10 includes a plurality of hollow vanes 72, each of which has a passageway 74 therethrough, as seen in FIG. 2.

Each of the vanes 72 has a heat reflective portion 76. The heat reflective portion 76 has an outer heat reflective surface 78 as seen in FIG. 3.

When the vanes are in a cooling or a shielding and insulating mode as seen in FIG. 3, the heat reflective surface 78 is positioned toward the outside of the building, the heat reflective surface acts to reflect the rays of sunlight, generally indicated at 80, impinging thereon. As can be seen in FIG. 3, the rays of sunlight 80, pass through the window and are reflected by the heat reflective surface 78.

The vanes 72 also have a heat absorptive portion 82 with a heat absorptive surface 84 thereon. When the vanes 72 are in a heating mode as seen in FIGS. 6 and 7, the heat absorptive surface 84 faces the outside of the building. In this heating mode, the vanes 72 operate to heat the air passing through the passageway 74 in the vanes to consequently heat the air in the room 22 as will be hereinafter more fully described.

In order to move the vanes 72 from the shielding and insulating or cooling position shown in FIG. 3 and the heating position shown in FIGS. 6 and 7, the vanes are rotatably mounted about an axis 86 as will be hereinafter more fully described.

Each of the vanes 72 are similar in construction and for ease of description and understanding as to the heating position and the shielding and insulating position in which they may be placed, only one of the vanes will be hereinafter more fully described. It should be clearly understood though that each of the vanes are similar in construction. It is within the contemplation of this invention that any hollow vane having a heat reflective surface and heat absorptive surface may be used.

The vane 72 has a predetermined length selected so that it can seal against the frame 24 as will be hereinafter more fully described. The vane 72 has a uniform cross-section with the heat absorptive portion 82 opposite the heat reflective portion 76. The portions 82 and 76 are separated by side portions 88, 90 as seen in FIG. 8.

The vane 72 must be capable of performing two diametrically opposite functions, that is, capable of transmitting as much heat from the sunlight to the air passing through the passageway 74 in the vane and on the other hand, being capable of insulating the air in the room 22 from the air outside and shielding the air in the room 22 from the heat from sunlight. In order to achieve these objectives, it is particularly important to select the size, shape and physical properties of the materials forming the vanes 72.

When the heat absorptive surfaces 78 of the vanes 72 are exposed to the sunlight passing through the window 18, it is their function to receive as much heat as possible from the sunlight and efficiently transfer that heat to the air in the passageways 74 of the vanes 72. In order to perform this function, it is important that the material forming the heat absorptive portion is selected from a material having a high thermal conductivity such as copper, aluminum or steel. It is also desirable to minimize the thickness of the heat absorptive portion 82 of the vanes 72. On the other hand, the heat absorptive portions 82 should have sufficient thickness to provide structural rigidity and strength. By minimizing the thickness of the heat absorptive portion 82, the start up time of the solar heat regulating device 10 of the present invention is minimized. When the sunlight impinges on the heat absorptive surface 84, it will not take as much time for the heat absorptive portion 82, and consequently the air in the passageway 74, to reach the maximum temperature that it may from exposure to the sun.

In order to efficiently absorb the heat from the sun, the heat absorptive surface 84 of the heat absorptive portion 82 is formed and finished so as to be highly heat absorptive. Preferably, the heat absorptive surface 84 is textured so as to substantially increase the heat transfer ability thereof by the "cavity" effect. The cavity effect provides that when light impinges on a cavity, a percentage of the heat from sunlight impinging on for example, the walls of that cavity, is transmitted into the material forming the cavity. The remaining percentage of the sunlight is reflected to another portion of the cavity where another portion of the sunlight is again absorbed by the material forming the cavity and the sunlight is subsequently reflected in the cavity a number of additional times so that very little heat from the sunlight is reflected by such a surface. Other heat absorptive surfaces are created by surface finishes such as anodizing and black paint.

In order to increase the efficiency of transfer of heat from the heat absorptive portion 82 of the vane 72, the vane 72 includes fins 92 which are thermally connected to the inner surface 94 of the heat absorptive portion 82. The fins 92 extend inwardly of the inner surface 94 into the passageway 74 of the vanes 72. It is important to understand that the fins 92 do not extend all the way across the passageway 72 and do not contact the heat reflective portion 76. Preferably, the fins 92 are spaced from the heat reflective portion 76. Otherwise, when the heat reflective portion 76 was to perform its function, as will be hereinafter more fully described, the fins 92 would act to conduct heat to the air in the passageway 74.

In order to rotatably support the vane 72 about the vertical axis 86, a rod support 96 is provided having an arcuate retainer portion 98. The arcuate retainer portion 98 has a rod retaining opening 100 therein which is centered around the axis 86. The axis 86 is positioned half way from the geometric center of the vane 72, that is, half way between the heat reflective surface 78 and the heat absorptive surface 84 and half way between the side portions 88, 90. The rod retaining opening 100 has a slot 102 which allows the rod retaining opening 100 to be formed when the U-shaped member 104 of the vane 72 is extruded as seen in FIG. 8. The U-shaped member 104 of the vane 72 includes the side portions 88, 90 and the heat absorptive portion 82 as seen in FIG. 8.

In order to provide a seal between the vanes 72 when they are in either a heat absorptive position or a heat reflective and insulating position, each of the side portions 88, 90 have slots 106 therein. The slots 106 retain a sealing means 108 therein which may be any conventional sealing means, such as a gasket of extruded or molded rubber. Preferably, the gasket or seal 108 is formed from a material that is resistant to sunlight for example, ethylene-propylene-dienen monomer, and is thereby capable of being exposed to the sunlight without decomposition or degradation.

The slots 106 in the side portions 88, 90 have a bottom surface 110 with angled side surfaces 112. The side surfaces 112 are angled toward each other as they extend from the bottom 110 toward the outer surface 114 of the side portions 88, 90. The seal 108 has an enlarged base portion 116 and an outwardly extending tapered fin portion 118. The enlarged base portion 116 is formed so as to be complimentary with the angled side surface 112 so that the seal 108 is retained in the slots 106.

The seal 108 and slots 106 extend throughout the length of the vane 72 so that when the vanes 72 are mounted in the frame 24 and positioned in either a heat absorptive position or a heat reflective and insulating position, the seals 108 on the vanes contact and displace the seals on the adjacent vanes as seen in FIG. 8. The vanes 72 are positioned in the frame 24 so that the seals 108 on the vanes adjacent to the frame are sealed against the frame as will be hereinafter more fully described.

As pointed out above, it is particularly desirable that the heat reflective portion 76 have the opposite characteristics of the heat absorptive portion 82. It is desirable that the heat absorptive surface operate to both reflect the sunlight impinging thereon and also insulate the air inside the passageway 74 and consequently the room from both the sunlight and the outside atmosphere. In this mode, the heat transfer between the inside and the outside air is minimized. To accomplish this feature, the side portions 88, 90 have an outer lip 120 having a slot 122 therein, which slot extends throughout the length of the vanes 72.

A reflective panel 124 is provided having an inwardly angled portion 126 shaped complimentary to the slot 122 as seen in FIG. 8. The reflective panel 124 is preferably formed from a material which has a low conductivity, for example, chlorinated polyvinyl chloride, acrylonitrite butadiene styrene, or polyvinyl floride. The reflective panel 124 may also be formed of a thermally conductive material such as copper, steel or aluminum but if a thermally conductive material is used, the thickness of the reflective panel 124 should be held to less than 0.018 inches which minimizes the heat retention characteristics of the panel while still allowing sufficient structural rigidity.

The reflective panel 124 has a highly reflective outer surface 78 which operates to reflect the sunlight impinging thereon. If a metal such as copper, steel or aluminum is used, the reflective surface 78 thereof is polished to maximize its reflective capabilities. If a non-reflective material such as plastic is used to form the reflective panel 124, a reflective surface material is applied to the panel to form the reflective surface 78 thereof.

In order to maximize the insulating qualities of the reflective panel 124, insulation material 130 is supplied to the inside of the reflective panel. This insulation material may be an insulation material well known to those skilled in the art, as for example, expanded polystyrene or high temperature fiberglass or styrofoam. Thus, when sunlight impinges on the reflective panel 124, it is reflected and since the reflective panel 124 has low heat retention and the insulating material 130 insulates much of the heat created by the sunlight, the air inside the room is held at a more uniform temperature.

On extremely cold or hot days when it is not desirable to allow for transfer of heat between the inside and outside air, the reflective panel 124 and insulation material 130 minimize the amount of heat transferred into or out of the building 12 through the window 18. It should also be clearly recognized that by sealing the vanes 72 against each other and the frame 24, as will be hereinafter more fully described, a "dead" air space is created between the window 18 and the vanes 72 which further acts as an insulator to further minimize the amount of heat transferred between the inside and outside air. It is within the contemplation of this invention that this "dead" air space may be vented to the atmosphere when the air therein is heated to a temperature greater than the outside temperature.

In order to secure the reflective panel 124 to the U-shaped member 104 of the vanes 72, an adhesive 126 is provided and is positioned between the angled portion 126 of the panel 124 and the slot 122 of the outer lip 120. The adhesive is selected from the group of adhesives which are temperature resistant and can operate at the elevated temperatures of the vanes 72, such as for example, epoxy resin adhesives. The adhesive 128 also provides a barrier between the reflective panel 124 and the U-shaped member 104 so that if they are formed of different materials, for example, aluminum and steel, electrolysis between the U-shaped member 104 and the reflective panel 124 is minimized.

The specific vane construction shown in FIGS. 1-8 should be considered as primarily illustrative. Another construction is illustrated in FIGS. 9-10. For ease of description, this alternate construction is numbered with numerals the same as those used in connection with the vane described in FIGS. 1-8 to denote common parts where appropriate and followed by the suffix letter "a" to denote this alternative vane design.

The present invention contemplates the use of a plurality of hollow vanes 72a, each of which has a passageway 74a therethrough as seen in FIG. 9. Each of the vanes 72a have a heat reflective portion 76a and a heat absorptive portion 82a as seen in FIG. 10. The heat reflective portion 76a has a heat reflective surface 78a and the heat absorptive portion 82a has a heat absorptive surface 84a. The vane 72a is mounted to rotate about the centrally located rotational axis 86a. The vane 72a has a generally U-shaped member 132 which is formed by the heat reflective portion 76a and the side portions 88a and 90a of the vane 72a. The U-shaped member is formed from a material having a low thermal conductivity such as plastic, for example, chlorinated polyvinyl chloride, acrylonitrite butadiene styrene or polyvinyl floride. These plastic materials have this important combination of features of a thermal conductivity which is lower than metal and act as a natural insulator but yet are capable of being exposed to direct sunlight and elevated temperatures and will not melt in elevated temperatures of the magnitude in which the vane 72a is subjected. The U-shaped member 132 can be molded as a plastic extrusion in one piece.

In order to provide the advantageous features described above in connection with the vanes 72 disclosed in FIGS. 1-8, the heat reflective portion 76a has a reflective finish material 134 placed thereon, such as a reflective electroplating or a reflective sheet material. The reflective material 134 may be placed on the heat reflective portion 76a by any means such as with an adhesive or electrodepositing.

In order to further enhance the insulating qualities of the heat reflective portion 76, an insulation material 130a is positioned on the inside of the heat reflective portion 76a and may be of any well known insulating material, such as expanded polystyrene or a high temperature fiberglass material. The side portions 88a and 90a form the side of the U-shaped member 132 and are on each lateral end of the heat reflective portion 76a. The side portion 90a has a chamfered outer surface 136 which is angled towards the geometric center of the side portion 90a. As will be hereinafter pointed out, the chamfered outer surface 136 allows for improved sealing with the seal 108a on the adjacent vane or the sealing means on the frame 24 as will be hereinafter further described.

The side portion 88a has a centrally disposed slot 106a extending along the length of the vane 72a. The slot 106a is shaped to receive the seal 108a therein. The outer end of the seal 108a has a hollow outer portion 138 which acts as a collapsible seal when in contact with the adjacent vane or the frame as seen in FIG. 9. Thus, when the vanes 72a are positioned in a heat reflective and insulating position or a heat absorptive position, the seal 108a provides a seal between the outwardly facing surface of the vanes and the inside of the building 12. The rotational axes 76a of the vanes 72a are positioned in the frame so that the hollow outer portion 138 of the seal 108a is in pressure engagement with the side portion 90a of the adjacent vane 72a or the frame.

In order to provide a heat absorptive portion 82a of the vane 72a, a panel 82a is provided having a heat absorptive material on its outer surface 84a. It should be understood that the outer heat absorptive surface 84a may include any heat absorptive finishes such as anodizing, black paint or the like. The panel 82a may be formed of a material having a high rate of thermal conductivity such as copper, aluminum or steel. The panel 82a is thin so that it does not require a great start up time. When the sunlight impinges on the heat absorptive surface 84a, the heat absorptive portion 82a is heated and consequently the air passing through the passageway 74a is heated.

In order to retain the plate 82a in the U-shaped member 132, the side portions 88a, 90a terminate in outer lips 120a. The outer lips 120a have inwardly facing slots 122a which are sized slightly smaller than the thickness of the plate 82a and thus, when the plate 82a is positioned in the slots, it is gripped and retained therein. It should be understood that it is within the contemplation of this invention to provide a temperature resistant adhesive between the U-shaped member 132 and the plate 82a to further secure those parts together.

In order to pivotally mount the vanes 72a about the rotational axis 86a, the U-shaped member 132 is formed with a rod support portion 96a having an arcuate retainer portion 98a with a rod retaining opening 100a.

It should be understood that the other vanes may be constructed of various materials and of different designs which accomplish the above-mentioned desired results.

As pointed out above, at particular times it is desirable to position the vanes 72 so that their heat reflective surface 78 faces the outside of the building 12 and at other times it is desirable for the heat absorptive surfaces 84 of the vanes 72 to face the outside of the building. For aesthetic reasons, other positions of the vanes are also desirable. For example, if limited viewing through the window 18 is desired, the vanes 72 may be rotated so that a person inside the room 22 has a view of the outside. The present invention provides this aesthetically pleasing feature by allowing the vanes to be rotated in any angular position with respect to the window so that people inside of the room 22 can see the outside with some degree of privacy depending on the angular position of the vanes. One such angular position is shown in righthand window 18 in FIG. 1 with the lefthand window 18 showing the vanes in a closed position.

The present invention also provides a means for mounting the vanes 72 so that they may be moved horizontally along the upper and lower frame members 26, 28 so that a majority of the window 18 is exposed for clear viewing therethrough.

This novel mounting means of the present invention provides an upper rod member 140 and a lower rod member 142 as seen in FIGS. 3 and 6. The rod members 140, 142 have an outer diameter slightly larger than the centrally located rod retaining opening 100 in the vanes 72 and may be assembled with the vanes by frictionally fitting the rods/40,/42 in the upper and lower ends/44,/46 respectively in the rod retaining opening 100 of the vane 72. A pin 141 is provided and extends through the upper rod 140 and the arcuate retainer portion 98 of the vane 72.

In order to secure the lower end of the vane 146 to the frame 24, the lower rod 142 extends from the lower end of the vane 146 towards the lower flange portion of the lower frame member 28 and terminates in an enlarged end portion 148. A cylindrical bearing member 150 is provided and is rotatably mounted on the end of the lower rod 142 by the enlarged end portion 148. The lower frame member 28 has a pair of track members 152 extending in an upwardly direction to restrict movement of the lower rod 142 and consequently the vane 72. As will be pointed out hereinafter in further detail, this mounting of the lower end of the vane controls the rotation of the vanes 72 while allowing lateral movement thereof when desired.

The mounting means of the present invention provides a vane carrier 154 as seen in FIG. 3 to support the upper end 144 of the vane 72. The vane carrier 154 has rollers 156 supported on the tracks 158, 160. The track 158 extends inwardly from the side flange portion 34 of the upper frame member 26. The track 160 extends toward the track 158 from the inside portion 162 of the upper frame member 26 and is secured to the inside portion 162. A slot is thereby provided between the tracks 158, 160 along which the upper rod 140 may move when desired as hereinafter described. The rollers 156 are rotatably secured to the main body 166 of the vane carrier 154 by means of an axle 164 secured to the main body 166.

An anti-racking guide member 168 is secured to the tracks 158, 160 inboard of the rollers 156 and extends along the length of the track 158, 160. The slot 169 co-acting with the guide 168 minimizes twisting of the vane carrier when it moves along the tracks 158, 160 as will be hereinafter more fully described. It should be understood that the anti-racking guide 168 and slot 169 may be of any configuration which accomplishes this purpose.

In order to support the upper end 144 of the vane 72, an opening 170 is provided in the main body 166 for receiving the enlarged geartoothed portion 172 of the gear 174 therein as seen in FIG. 3. The lower cylindrical portion 176 of the gear 174 extends downwardly from the opening 170 of the main body through the bearing surface 178 of the main body. Thus, the gear 174 is rotatably mounted in the main body 166 of the vane carrier 154 and is restricted from longitudinal movement therein. The lower cylindrical portion 176 of the gear 174 includes means, such as a collar 180 therein, to secure the upper end of the upper rod 140 to the gear 174. Accordingly, the upper end 144 of the vane 72 is thereby supported.

The gear 174 has two separate portions, that is, the geartoothed portion 172 and the lower cylindrical portion 176 which portions are assembled and secured together after being positioned in their respective openings 178. It should also be understood that other constructions are available in which the gear 174 may be manufactured in one piece and the body 166 in several pieces.

Means are provided for rotating the vanes 72 between the heat reflective position and the heat absorbing position. The rotating means include a crank 182 which is drivingly connected to a worm gear 184 as seen in FIG. 4. The crank 182 is rotatably mounted to the upper frame member 26 through an opening therein as seen in FIG. 5.

The rotating means also includes a worm gear 186 drivingly connected to a square rod 188 as seen in FIG. 4. The worm gear 186 is in meshing engagement with the worm gear 184 so that upon rotation of the crank 182 the worm gear 186 is rotated thereby at a lower rotational speed than the crank 182. The square rod 188 has a square cross-section and is rotatably mounted to the vertical frame members 30 and adjacent to and extends along the upper frame member 26 as seen in FIG. 4. The square rod 188 is secured to the worm gear 186 so that upon rotation of the worm gear 186, the square rod is rotated at the same rotational speed.

The vane rotating means of the present invention also includes bevel gears 190 as seen if FIGS. 3 and 4. The bevel gear 190 includes a gear portion 192 and a cylindrical portion 194. The bevel gear has a square opening 196 passing through the gear portion and cylindrical portion 192, 194 respectively. The square opening 196 is complimentary in configuration to the cross-sectional configuration of the square rod 188 and is slightly larger. This allows the bevel gear 190, and consequently the vane carrier 154, to slide along the square rod 188 as will be hereinafter more fully described. The bevel gear 190 is rotatably received in a bevel gear opening 198 in the main body 166 of the vane carrier 154 and is positioned so that the gear portion 192 is in meshing engagement with the geartoothed portion 172 of the bevel gear 174.

Accordingly, when the crank 182 is rotated, the vanes 72 are rotated by means of the worm gears 184, 186, square rod 188, bevel gear 190, gear 174 and upper rod 140 which are all in driving engagement with each other. Accordingly, by rotation of the crank 182, the vanes 72 may be moved between a heat reflective position and a heat absorption position or any angular position desired therebetween.

As was previously pointed out, the present invention also provides for moving the vanes in a lateral direction so as to allow clear viewing through a substantial portion of the window 18. The present invention provides means for moving the vanes 72 in a horizontal direction so that they are all adjacent to one end of the frame 24, hereinafter referred to as an "open" position. The vane moving means also allows for moving the vanes back to a position so that they are spaced across the window 18 and can be moved between a heat absorptive position and a heat reflective position which will be referred to as a "closed" position.

The means for horizontally moving the vanes 72 between the open and the closed position includes a reversible motor 200 secured to the frame 24. The motor 200 may be driven in either direction and has a beveled gear 202 attached thereto and in meshing engagement with a bevel gear 204. The bevel gear 204 is drivingly connected to the input side of a reducing gear box 206. The ouput side of the reducing gear box is drivingly connected to a ball chain pulley 208. The reducing gear box 206 operates to rotate the ball chain pulley 208 at a lower speed than the speed of rotation of the motor 200.

The means for horizontally moving the vanes 72 of the present invention includes a ball chain 210 drivingly connected to the ball chain pulley 208 and supported by another ball chain pulley 212. The ball chain pulley 212 is rotatably supported on the frame 24 by means of the idler shaft 214 as seen in FIG. 4. The ball chain passes through an opening 216 in each of the vane carriers 154 and is secured to the vane carrier 154 which is furthest away from the end of the frame 24 on which the motor 200 and reducing gear box 206 is mounted.

Figure 11:
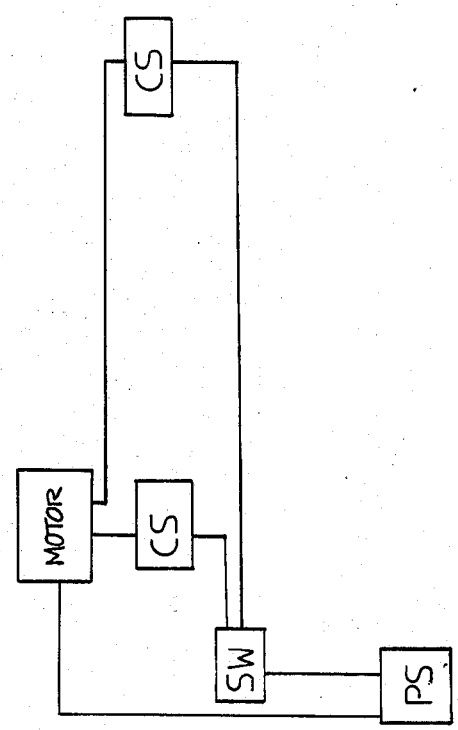
FIG. 11 is a schematic diagram of the circuitry for selectively operating the preferred embodiment of the present invention.

When it is desired to move the vanes 72 from the closed to the open position, the operating switch 222 as seen in the schematic diagram of FIG. 11, is manually moved to an open position. The motor 200 is energized to rotate the reducing gear box 206 and correspondingly the ball chain 210 so that the outermost vane is pulled toward the end of the frame 24 in which the motor 200 and reducing gear box 206 is mounted. The operating switch 222 can be released at any time to discontinue moving the vanes 72 to the open position. If the operating switch 222 remains in an open position when the outermost vane reaches a fully open position, the limit switch 218 is activated by the outermost vane to cut off supply of power to the motor 200 and thereby deactivate and protect the motor and drive mechanism. It is within the contemplation of this invention to provide a clutch in the drive mechanism to further protect the drive components.

When it is desired to move the vanes to the closed position, the operating switch 222 is manually moved to a closed position which rotates the motor 200 in the opposite direction and accordingly, moves the ball chain 210 and correspondingly the vanes 72 in an opposite direction. In order to properly space the vanes so that their rotational axes 86 are properly spaced in the closed position, the linkage mechanism 224 is provided.

The linkage 224 includes a series of spacer links 226. One end of the spacer links is rotatably mounted to the frame 24 or the vane carrier 154. The other end of the spacer links 126 has stop portions 228 thereon so that as the vanes are moved to an open position the vanes 72 are the proper distance from each other. When the stops 228 of the spacer links 226 contact each other, any further movement of the vanes 72 from each other is prohibited.

When the vanes 72 are in an operating position and spaced from each other a proper distance so that they are positioned in either a heating position or an insulating and shielding position, it is important to seal the outwardly facing surface (either surfaces 78 or surfaces 84 of the vanes 72) from the air inside the room 22. By effectuating such a seal, the air trapped between the window 18 and the outwardly facing surface of the vanes 72 may act as an insulating space or a heat retaining space if desired depending of course on the prevailing weather conditions.

For example, on a cold sunny day, this dead air space assists in retaining any heat reflected by the heat absorptive surfaces 84 and in the evening when the sun is not shining, the dead air space acts as an insulator. On an extremely hot sunny day, the heat of the sunlight is reflected by the heat reflective surfaces 78 on the vanes and heats the air space between the window 18 and the vanes 72. If the window is closed, this dead air space acts as an insulator. It should also be recognized that the window 18 may be slightly open to allow heated air between the window and the vanes to escape to the atmosphere if desired.

The means for sealing the outwardly facing surfaces of the vanes 72 from the inside air include the seals 108 on the vanes and vane sealing means 237 between the frame 24 and the vanes 72. The vane sealing means 237 between the frame 24 and the vanes 72 provides for sealing the outermost vane to the vertical frame members 30 and for sealing the upper ends 144 of the vanes and the lower ends 146 of the vanes to the upper and lower frame members 26, 28 respectively.

In order to seal the vanes 72 adjacent to the vertical frame members 30, the vertical frame members are positioned adjacent to the end vanes 72 as seen in FIG. 7. The side portion 48 of the vertical frame members 30 has an inner vane contact surface 238 which contacts the seal 108 of the vanes 72. The surface 238 is positioned a sufficient distance from the rotational axis 86 so that the seal 108 is slightly deformed when the vanes 72 are in either a heating position or a reflective and insulating position while on the other hand, being spaced a sufficient distance from the rotational axis 86 to allow for movement of the vanes between these two positions.

When the seal 108 is so deformed as it contacts the surface 238 of the vertical member 30, a sealing relationship is effectuated therebetween. It should be understood that when a vane constructed in accordance with FIGS. 9 and 10 is used, a separate sealing gasket is applied to the surface 238 of the vertical frame member 30 and contacts the chamfered outer surface 136 of the vane 72a or the side portion 88a and seal 108a, dependent of course on the position of the vane 72a.

In order to effectuate a seal between the upper and lower ends 144, 146 respectively, and the upper and lower frames 26, 28 respectively, the lower flange portion 36 of the upper frame member 26 and the upper flange portion 38 of the lower frame member 28 extend inwardly to a position adjacent to the outwardly facing portion of the vane 72. As mentioned above, either the heat reflective portion 76 or the heat absorptive portion 82 may be the outwardly facing portion depending on the position of the vane 72. Both the lower flange portion 36 and the upper flange portion 38 of the frame members 26, 28 respectively, have grooves 240, 242 respectively extending along the length thereof and positioned adjacent to the outwardly facing portions at the upper and lower ends 144, 146 respectively of the vanes 72. Seal members 244, 246 are retained in the grooves 240, 242 respectively and extend along the length of the upper and lower frame members 26, 28 respectively and toward the vanes 72. The seals 244, 246 each have an enlarged portion which contacts the upper and lower ends 144, 146 of the vanes 72 when in an operative mode to thereby seal the upper and lower ends of the vanes 72 to the frame 24. The seals 244, 246 may be of any conventional design well known to those skilled in the art and is constructed from a material that is resistant to sunlight such as chlorinated polyvinyl chloride, acrylonitrite butadiene styrene or polyvinyl floride.

As described hereinabove, when the vanes 72 are in the heating mode it is one of the features of this invention to conduct the air from the inside of the room 22 through the vanes 72 and return the heated air to the room. The lower manifold means 248, as shown in FIG. 3, are provided for receiving the air from the room and conducting that air to the lower end 146 of the vanes 72. The upper manifold means 250 is provided for conducting the heated air from the upper end 144 of the vanes back to the room 22.

The lower manifold means includes the inner portion 252 of the lower frame member 28. The inner surfaces of the inner portion 252, lower flange portion 42, side flange portion 40 and upper flange portion 38 of the lower frame member 28 provide a manifold which contains the air to be supplied to and flow through the passageways 74 of the vanes 72.

In order to allow air from the inside of the room to enter the lower manifold means 248, a plurality of slots 254 are provided through the inner portion 252 of the lower frame member 28. It is important to recognize that the cross-sectional areas of the slots 254 are at least as great as the cross-sectional areas of all the passageways 74 of all the vanes 72 in the solar heat regulating device 10 of the present invention. If this were not the case, the free flow of air through the passageways 74 of the vanes 72 would be restricted and maximum heating of the air would not be thereby effectuated.

If the vanes 72 are in a heat shielding and insulating position, as shown in FIG. 3, it is particularly desirable to seal the air from the room 22 from the passageways 74 of the vanes 72. By so sealing the air in the room 22 from the passageways 74, another insulating barrier is realized between the outside atmosphere and the air inside the room. This insulating barrier provides an insulating layer of "dead" air described by the air in the passageways 74 of the vanes 72. The other insulating barrier is provided between the vanes 72 and the window 18 which described another insulating layer of "dead" air. This feature further improves the operation of the present invention by providing two insulating barriers or two insulating layers of "dead" air to minimize the amount of heat that can be transferred between the inside and the outside air.

To effectuate this feature of the present invention, an intake control plate 256 is provided adjacent to the inner portion 252 of the lower frame member 28. The intake control plate 256 has a plurality of air intake slots therein particularly as seen in FIG. 4 which air intake slots 258 may be positioned adjacent to the slots 254 in the lower frame member 28 to allow free flow of air therethrough from the room therethrough. The air intake control plate may be moved by manually actuated pin 260 as seen in FIG. 2 which is received in a centrally located slot 262 in the inner portion 252 of the lower frame member 28. The intake control plate 256 is received in retainer means such as a slot 264 provided in the inner portion 252 of the lower frame member as particularly seen in FIG. 3. Thus, the air intake control plate 256 may be moved from an open position wherein air from inside the room 22 is allowed to flow freely through the slots 254 to a closed position where movement of air through the slots 254 is prohibited to thereby seal the air in the room 22 from the passageways 74 in the vanes 72.

As the air passes through the passageways 74 in the vanes 72, when the vanes are in a heating mode, the air is heated thereby and naturally rises according the the "chimney" effect as hereinabove described. On the other hand, when the intake control plate 256 is in a closed position, the air in the passageways 74 of the vanes 72 is entrapped therein and prohibited from moving therethrough and accordingly, acts as an insulator to minimize the amount of heat transferred between the inside and the outside atmospheres.

At times, it is desirable to drive the air through the passageways 74 in the vanes 72 to maximize the heating effect thereof. Accordingly, the present invention contemplates the use of an optional blower mechanism 268 as seen in FIGS. 3 and 4 to drive the air through the passageways 74. The blower means 268 includes a motor 270 which drives any conventional fan such as the squirrel cage fan blower blades 272. The blower blades 272 are rotated by the motor when power is supplied thereto and are surrounded by a blower cage 274. The blower cage 274 allows air to enter through the air intake slots 254 and 258 and drives the air received thereby through the passageways 74 in the vanes 72. By so moving the air through the passageways 74, cooler air is constantly supplied to pass along the heating surfaces of the vanes 72. Due to the greater heat differential between the heat surfaces of the vanes 72 and a lower temperature of the air passing through the passageways 74, a greater amount of heat is thereby transferred to the air passing through the vanes 72.

To conduct the heated air from the passageways 74 in the vanes 72, the upper manifold means 250 as seen in FIG. 6 is provided.

The upper manifold means 250 includes the upper manifold portion 276 of the lower flange portion 36 of the upper frame member 26 extending inwardly thereof and upwardly away from the upper end of the vane. The upper manifold means also includes an upper manifold outlet member having a manifold surface 280. The upper manifold outlet member 280 is secured to the inside portion of the upper frame member 26 by fasteners 282 or any conventional means well known to those skilled in the art. The manifold surface 280 has substantially a smooth continuation of the upper manifold portion 276 to direct the air from the upper end 144 of the vane 72 back to the room 22.

When the vanes 72 are positioned in a reflective and insulating position as above-described, it is within the contemplation of this invention to seal the air inside of the passageways 76 of the vanes 72 to provide a "dead" air space therein which further acts as an insulator as described herein. Accordingly, the present invention provides a sealing means to seal the upper end 144 of the vanes 72 when desired. This sealing means includes a valve member 284 having a fixed portion and a pivot portion 288. The fixed portion 286 is secured to the upper manifold portion 276 by an adhesive or any other means well known to those skilled in the art. The pivot portion 288 rotates about the fixed portion and has a plurality of slots 290 therein which are spaced so as to receive the upper rods 140 therein when the rotational axes 86 are positioned so that the vanes 72 can be moved between their heating and reflective positions. The sealing means also provides a plate 292 having a plurality of slots 294 therein complimentary with the slots 290 in the pivot portion 288 of the valve member 284. By manually inserting the plate 292 over the pivot portion 288 of the valve member 284 as seen in FIG. 6, the air inside of the passageways 76 of the vanes 72 is effectively sealed therein.

In operation, the solar heat regulating device 10 of the present invention operates to alternately shield and insulate the air in the building 22 from the heat of sunlight and heat with sunlight the air in the building 22. When in the heating mode as shown in FIG. 6, the heating absorptive surface 84 is positioned towards the outside of the building. In this position, the vanes 72 are sealed against each other and against the frame 24 to provide a "dead" air space between the window 18 and the heat absorptive surface 84. The air intake control plate 256 is in an open position to allow for the free flow of air through the passageways 74 in the vanes 72. Accordingly, the heat from the sunlight is efficiently transferred to the air flowing through the passageways 74.

As the air rises in the passageways 74 by the "chimney" effect and optionally by the effect of the supplemental pressure provided by the blower 268, the air in the passageways 74 is expelled through the upper end 144 of the vanes 72. The upper manifold means 250 provides for conducting the heated air to return to the room 22.

When it is desired to move the vanes 72 to a position so that some restricted viewing may be had through the window as seen in FIG. 1, the crank 182 is rotated to consequently rotate the vanes 72 about their axes 68. The vanes 72 may be positioned at any angular position with respect to the window 18 so that the desired viewing through the window may be effectuated.

If it is desired to move the vanes 72 to a cooling mode as shown in FIGS. 2 and 3, the crank 182 is continued to be rotated until the heat reflective surface 78 faces the outside of the building and the vanes 72 are sealed with respect to each other and the frame 24. In this position, when sunlight impinges on the reflective surface 78 through the window 18, the rays of sunlight are reflected and the air inside the room 22 is shielded from the sunlight. In addition, since the vanes and frame are sealed, a "dead" air space is effectuated between the vanes 72 and the window 18. The "dead" air space therebetween operates as an additional insulator.

In addition, to further enhance the insulating qualities of the solar heat regulating device 10 of the present invention when in this position, the manually actuated pin 260 connected to the air intake control plate may be moved to a position so that the slots 258 of the air intake control plate are no longer in alignment with the slots 254 of the lower frame member 28. Accordingly, the air in the room 22 cannot freely enter the lower manifold 248. To further seal the air in the passageways 74 in the vanes 72, the pivot portion 288 of the valve member 284 is positioned over the upper ends 144 of the vanes 72 and the plate 294 is manually positioned on top of the pivot portion 288 of the valve member 284 with the slots 294 thereof received adjacent to the upper rod 140. Accordingly, the air contained in the passageways 74 of the vanes 72 is another "dead" air space which further insulates the air inside of the room from the outside atmosphere to further decrease the amount of heat that my be transferred therebetween.

When it is desired to move the vanes 72 to an open position so that clear viewing through the window 18 may be had, the plate 292 is removed, and the pivot portion 288 of the valve member 284 is raised so that the slots 290 thereof no longer co-act with the upper rods 240 and the upper rods 240 are free to move in a horizontal direction along the upper and lower frame members 26,28.

To so move the vanes 72 in a horizontal position, the operating switch 222 is moved to an open position and accordingly, power is supplied to the motor 200. The motor 200 moves the vanes to an open position as hereinabove described. If desirable, at any point in time, the operating switch may be released to disconnect the power supply from the motor 200 and the vanes 72 may be left in a partially open position.

If the operating switch 222 is held in an open position until the vanes 72 are moved to a completely open position, the furthest vane 72 from the direction of movement of the vanes contacts a limit switch 218 which disconnects the power supply from the motor 200 and accordingly, stops movement of the vanes.

When it is desirable to "close" the vanes 72, that is, so that their vertical axes 86 are positioned so that the vanes 72 can be moved between a heat reflecting and a heat absorptive position, the operating switch 222 is manually moved to a closed position which connects the power supply to the motor 200 so that the motor rotates in the opposite direction to move the vanes 72 accordingly. The vanes 72 are so moved and their relative position of their axes is positioned by the spacing linkage 224 so that the axes 86 of the vanes are properly positioned.

When the outermost vane 72 reaches its proper position, its vane carrier 154 contacts the limit switch 220 to disconnect the power supply from the motor 200 and thereby cease movement of the vanes 72. When the vanes 72 are in this position, they may be moved either to a heat absorptive position or a position in which they reflect the sunlight and insulate the air inside of the room 22 from the outside atmosphere.

Having described my invention, I claim:

1. A solar heat regulating device for selectively heating with sunlight the air inside a building having a window and shielding and insulating the air inside the building from the heat of sunlight outside the building including:
    a frame for mounting said solar heat regulating device inside the building and adjacent to the window,
    a plurality of hollow vanes, each of said vanes having at least one passageway for passing air therethrough,
    said vanes having a heat absorptive surface on a first side thereof which allows solar radiation impinging on said heat absorptive surface to heat the air contained in said one passageway of said vanes,
    said vanes having a heat reflective surface on a second side of said vanes which reflects the solar radiation impinging on said second side of said vanes and shields the inside of the building from solar radiation impinging on said vanes,
    said vanes having side portions extending between said first and second sides of said vanes, said side portions, and said first and second sides forming said one passageway through each of said vanes, said side portions and said first and second sides of said vanes terminating in top end and bottom end portions,
    means for rotatably mounting said plurality of vanes to said frame about substantially vertical axes to selectively position one of said first and said second sides of said vanes to face the outside of the building and adjacent to the inside of the window,
    a first manifold means for conducting cooler air from the inside of the building to the bottom of said passageways of said vanes, said first manifold means having a portion thereof positioned adjacent said bottom end portion of each of said vanes,
    a second manifold means for conducting heated air from the top of said passageways of said vanes to the inside of the building, said second manifold means having a portion thereof positioned adjacent said top end portion of each of said vanes,
    means for sealing said outside facing surface of said vanes from the inside of the building and providing a sealed space between said vanes and the window,
    said outside sealing means including at least one seal member extending along at least one of said side portions of each of said vanes from said top end portion to said bottom end portion,
    said outside sealing means including means for sealing said bottom end portion of said vanes to said first manifold means, said bottom end sealing means including at least one bottom seal member secured to one of said bottom end portions of said vanes and said first manifold means, said one bottom seal member extends substantially cntinuously along said bottom end portions of said vanes and said first manifold means when said vanes are positioned with one of said first and second sides thereof facing the outside of the building and,
    said outside sealing means including means for sealing said top end portion of said vanes to said second manifold means, said top end sealing means including at least one top seal member secured to one of said top end portions of said vanes and said second manifold means, said one top end seal member extends substantially continuously along said top end portions of said vanes and said second manifold means when said vanes are positioned with one of said first and second sides thereof facing the outside of the building.

2. A solar heat regulating device as defined in claim 1 wherein said first sides of said vanes are formed from a material having a high thermal conductivity, and said second sides of said vanes are formed from a composite material having a low thermal conductivity with an outer reflective surface.

3. A solar heat regulating device as defined in claim 1 wherein said rotatable mounting means includes means for rotating said plurality of vanes about substantially vertical axes between a first position in which one of said first and second sides of said vanes faces the outside of the building and a second position in which the other of said first and second sides of said vanes faces the outside of the building.

4. A solar heat regulating device as defined in claim 1 which includes means for moving at least a portion of said vanes in a substantially horizontal direction to allow for viewing through the window.

5. A solar heat regulating device as defined in claim 1 wherein at least one of said vanes includes insulation material adjacent to said heat reflective surface of said one vane.

6. A solar heat regulating device as defined in claim 1 wherein at least one of said vanes includes heat exchange fins positioned in said passageway of said vane, said fins thermally connected to said heat absorptive surface.

7. A solar heat regulating device as defined in claim 1 which includes means for moving air through said passageways of said vanes.

8. A solar heat regulating device as defined in claim 1 in which said frame includes means for adjusting said frame to allow said frane to be mounted in windows having various configurations.

9. A solar heat regulating device as defined in claim 1 which includes means for closing at least one of said first and said second manifold means from conducting air therethrough.

* * * * *